INVENTORS
DONALD B. ROGERS
ROBERT D. SHANNON

BY James H. Ryan

ATTORNEY

United States Patent Office 3,498,931
Patented Mar. 3, 1970

3,498,931
ELECTRICALLY CONDUCTIVE OXIDES CONTAINING PALLADIUM AND THEIR PREPARATION
Donald B. Rogers and Robert D. Shannon, Wilmington, Del., assignors to E. I. du Pont de Nemours and Company, Wilmington, Del., a corporation of Delaware
Continuation-in-part of application Ser. No. 625,318, Mar. 23, 1967. This application Apr. 2, 1968, Ser. No. 718,046
Int. Cl. H07b *1/08;* C01g *55/00, 37/00*
U.S. Cl. 252—518                                6 Claims

ABSTRACT OF THE DISCLOSURE

Described and claimed are novel electrically conductive oxides of the formula $PdMO_2$, M being Co, Cr, Rh, or Cr/Rh, but which may vary slightly in stoichiometry from the formula, the preparation of the oxides, e.g., by the reaction of a palladium dihalide optionally mixed with palladium and an appropriate oxidic reagent containing the element M, and electric elements, e.g., resistors, containing the oxides.

RELATED APPLICATION

Figure 1:
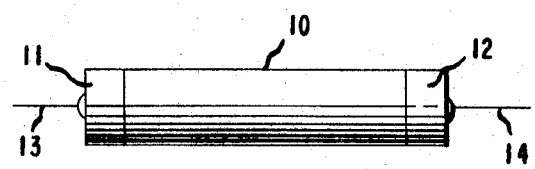

This application is a continuation-in-part of our copending application Ser. No. 625,318, filed Mar. 23, 1967, and now abandoned.

FIELD OF THE INVENTION

This invention relates to novel oxides of formula $PdMO_2$, wherein M is selected from Co or at least one of Cr and Rh, said oxides having electrical properties which make them suitable for use in electrical resistance elements, and to methods for their preparation.

SUMMARY AND DETAILED DESCRIPTION

The compounds of this invention are oxides containing palladium which can be represented by the single formula $PdMO_2$, wherein M is selected from Co or at least one of Cr and Rh, or by the two formulae $PdCoO_2$ and $PdCr_xRH_{1-x}O_2$, where $x$ may be 0–1. The exact proportions of the elements may vary slightly from the stoichiometric values. In the case of the mixed Cr/Rh oxides, either of the two metals may be substituted continuously for the other. The oxides have a crystal structure based on the rhombohedral space group $R\bar{3}m$. Cell edges and rhombohedral angles based on the corresponding hexagonal cells are recorded in the following Table I for the compositions $PdCoO_2$, $PdCrO_2$, and $PdRhO_2$. The oxides are good electrical conductors exhibiting anisotropic resistivity. They are stable to temperatures of the order of 900° C. and are stable under mildly reducing conditions. They are insoluble in nitric and hydrochloric acids, but are somewhat soluble in warm aqua regia.

TABLE I

[Cell edges for the hexagonal cells of $PdCoO_2$, $PdCrO_2$ and $PdRhO_2$ and the derived edges and rhombohedral angles for their corresponding rhombohedral cells]

|  | Hexagonal cell | | Rhombohedral cell | |
|---|---|---|---|---|
| Compound | a(A.) | c(A.) | a(A.) | α |
| $PdCoO_2$ | 2.83±0.05 | 17.74±0.10 | 6.13±0.05 | 26°40′±5′ |
| $PdCrO_2$ | 2.92±0.05 | 18.08±0.10 | 6.26±0.05 | 27°0′±5′ |
| $PdRhO_2$ | 3.02±0.05 | 18.08±0.10 | 6.27±0.05 | 27°52′±5′ |

The oxides of this invention are prepared by reaction of a palladium dihalide, e.g., $PdCl_2$, or mixtures of palladium dihalide and palladium with an oxidic reagent containing the element M, wherein M is selected from Co or at least one of Cr and Rh, at a temperature of 600–950° C., preferably 650 to 850° C. in a closed reaction vessel. Oxidic reagents that are useful for these reactions include the cobalt oxides, e.g., CoO and $Co_3O_4$, the ternary alkali metal cobalt (III), rhodium (III), and chromium (III) oxides, e.g., $LiCoO_2$, $LiRhO_2$, $LiCrO_2$, etc., and the ternary cobalt (III), rhodium (III), and chromium (III) oxides of the rare earth elements or yttrium, e.g., $LaCoO_3$, $LaCrO_3$, $LaRhO_3$, etc. Optionally $PdCoO_2$ can be prepared by direct reaction of PdO and CoO at temperatures of 800° C., or higher, provided that sufficient external pressure to suppress the decomposition of PdO is applied.

A preferred embodiment of this invention involves the syntheses of the compounds $PdMO_2$, wherein M is selected from Co or at least one of Cr and Rh, by reaction of equimolar mixtures of palladium and a palladium halide, e.g., $PdCl_2$, with the stoichiometrically required quantities of an oxidic reagent M′$MO_2$, wherein M′ is an alkali metal, e.g., Li, at a temperature of 650 to 850° C. in a sealed reaction vessel. These reactions are illustrated by the following equation:

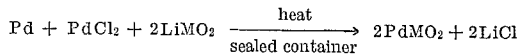

$$Pd + PdCl_2 + 2LiMO_2 \xrightarrow[\text{sealed container}]{\text{heat}} 2PdMO_2 + 2LiCl$$

In another embodiment of this invention the compounds $PdMO_2$, wherein M is selected from Co or at least one of Cr and Rh, are prepared by reaction of equimolar mixtures of palladium and a palladium halide, e.g., $PdCl_2$, with an oxidic reagent M″$MO_3$, wherein M″ is a rare earth metal or yttrium, e.g., $LaCrO_3$, $LaRhO_3$, $LaCoO_3$, etc., at a temperature of 650 to 850° C. in a sealed reaction vessel. These reactions are illustrated by the following equation:

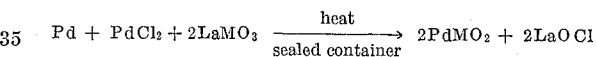

$$Pd + PdCl_2 + 2LaMO_3 \xrightarrow[\text{sealed container}]{\text{heat}} 2PdMO_2 + 2LaOCl$$

$PdCrO_2$ and $PdRhO_2$ are miscible in all proportions and single phase compositions of the formula $PdCr_xRh_{1-x}O_2$, where $x$ may be 0–1. may be prepared by the two foregoing embodiments in which the oxidic reagents contain one or both of Cr and Rh. For example, the following general equation illustrates the process of the preferred embodiment:

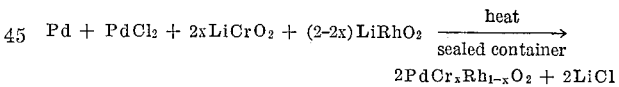

$$Pd + PdCl_2 + 2xLiCrO_2 + (2-2x)LiRhO_2 \xrightarrow[\text{sealed container}]{\text{heat}}$$
$$2PdCr_xRh_{1-x}O_2 + 2LiCl$$

In another embodiment of this invention, palladium cobalt oxide is prepared by the reaction of a palladium dihalide, e.g., $PdCl_2$, with cobaltous oxide CoO at a temperature of 650 to 850° C. in a sealed reaction vessel. Optionally, the reaction can be carried out in the presence of an additional cobalt oxide containing trivalent cobalt, e.g., $Co_3O_4$; however, products having the highest phase purity are obtained in this embodiment when the only cobalt oxide present is cobaltous oxide. The reaction is illustrated by the following equation:

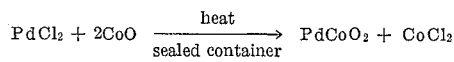

$$PdCl_2 + 2CoO \xrightarrow[\text{sealed container}]{\text{heat}} PdCoO_2 + CoCl_2$$

Another embodiment of this invention involves the synthesis of $PdCoO_2$ by reaction of equimolar mixtures of palladium and a palladium halide, e.g., $PdCl_2$, with cobaltous cobaltic oxide $Co_3O_4$ at a temperature of 650 to 850° C. in a sealed reaction vessel. This reaction is illustrated by the following equation:

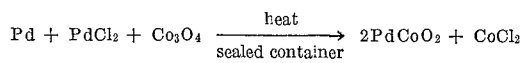

$$Pd + PdCl_2 + Co_3O_4 \xrightarrow[\text{sealed container}]{\text{heat}} 2PdCoO_2 + CoCl_2$$

In yet another embodiment of this invention, $PdCoO_2$ is prepared by direct reaction of PdO and CoO at a temperature of 800° C., or higher, under the influence of externally applied pressure to suppress PdO decomposition. This reaction is illustrated in the equation:

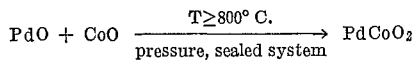

$$PdO + CoO \xrightarrow[\text{pressure, sealed system}]{T \geq 800° C.} PdCoO_2$$

The time of reaction is not critical. For example, reaction may be effected in 4 to 36 hours though for convenience a reaction period of about 16 hours is preferred.

The processes of the above embodiments that involve palladium halide as a reagent are conveniently carried out by placing a mixture of the reagents in the stoichiometric proportions required by the appropriate chemical equation in an inert reaction vessel capable of withstanding the reaction conditions. Preferably, the reaction vessel is a Vycor® or fused silica tube and in this case the vessel is evacuated to remove air and sealed. Sealed vessels of other high melting, inert materials, such as platinum, gold, stainless steel and the like, may be used without evacuation prior to sealing provided that appropriate precautions, such as application of external pressure, crimping to expel air, and the like, are taken to prevent vessel rupture due to the development of internal pressure on heating.

The vessel and its contents may be heated by conventional means, e.g., in an electric furnace at a temperature of 650 to 850° C., preferably 700 to 750° C. for a period of time ranging from 16 to 36 hours, or more. In the preferred embodiment and in other embodiments in which a palladium halide is used as a reagent in conjunction with appropriate reaction vessels and reaction temperatures less than about 850° C., the reactions may be effected under autogenous pressure. Reaction pressure, however, is not a critical variable below the decomposition temperature of $PdMO_2$, and reaction may be carried out at any applied pressure up to 3000 atmospheres, or even at higher pressures.

After heating is completed, the reaction vessel is cooled, opened, and the crystalline product is removed. This product is leached with water to remove soluble byproducts, e.g., $CoCl_2$, LiCl, etc., and then dried. If the reaction product contains excess $PdCl_2$, leaching with dilute aqueous HBr is preferable since the HBr solution dissolves the excess $PdCl_2$ as well as the water-soluble byproducts.

The palladium halides that can be employed in this process include palladium difluoride, dichloride, dibromide, and diiodide. For the synthesis of palladium cobalt oxide the reagent containing cobalt may be selected from at least one of CoO and $Co_3O_4$. When mixtures of these reagents are used, the product is formed even though the proportions of di- and trivalent oxides employed vary considerably. However, when the proportions of reactants do not correspond to the stoichiometric requirements of the chemical equation, the hexagonal palladium cobalt oxide is contaminated with other phases, e.g., unreacted palladium halide, Pd, PdO, and $Co_3O_4$, depending on the reactants and their proportions employed.

For the synthesis of the hexagonal oxides $PdMO_2$, wherein M is selected from Co or at least one of Cr and Rh, the oxidic reagents containing M are preferably ternary oxides containing a highly electropositive element in addition to the cation M. These reagents permit metathetical reactions leading to the formation of halides of the highly electropositive elements as byproducts and facilitate formation of the $PdMO_2$ compounds at temperatures below 800° C. Reagents suitable for such reactions include the ternary oxides containing an alkali metal e.g., $LiMO_2$, $NaMO_2$, $KMO_2$, etc., ternary oxides containing a rare earth element of atomic number 57 to 71 or yttrium, e.g., $LaCoO_3$, $LaCrO_3$, $LaRhO_3$, $YCrO_3$, etc., ternary oxides containing an alkaline earth metal such as Mg, Ca, Sr or Ba, e.g., $CaCr_2O_4$, and the like. Again maximum phase purity is effected when the reagents are used in stoichiometric proportions.

The palladium halides and the oxidic reagents can be of the grades commercially available, or preparable from commercially available reagents. However, it is preferred that grades of highest purity be employed.

Figure 2:
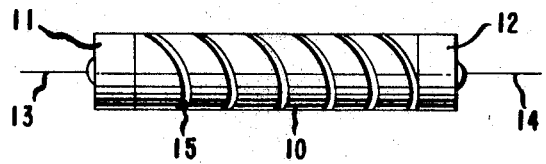

The novel electrically conductive compounds of this invention are useful in electrical resistors. Such resistors are shown in the drawing wherein:

FIG. 1 illustrates a resistor in which a nonconductive rod serving as a base is completely covered with a compound of the invention; and FIG. 2 illustrates a resistor similar to that of FIG. 1 except that here a spiral groove is cut around the base used and through the electrically conductive coating into the nonconductive material underneath to lengthen the conductive path.

EMBODIMENTS OF THE INVENTION

The palladium-containing oxides of this invention and their preparation are described in greater detail in the following examples.

EXAMPLE 1

A mixture of 0.4239 g. of $PdCl_2$, 0.2878 g. of $Co_3O_4$ and 0.0896 g. of CoO (corresponding to the hypothetical composition $Pd_{1.6}Co_{1.6}O_4$) is sealed into an evacuated silica tube ⅜" in diameter and 4" long, and heated for 36 hours at 750° C. After cooling, the tube is opened and a red deposit is observed on the walls, this indicating the presence of unreacted $PdCl_2$. The crystalline product is leached in water to remove $CoCl_2$ and is then dried. X-ray diffraction patterns of the product can be indexed on the basis of a hexagonal phase having the same structure as $CuFeO_2$. The diffraction pattern also indicates the presence of $Co_3O_4$ and PdO.

EXAMPLE 2

A mixture of 0.2227 g. of $PdCl_2$, 0.0318 g. of $Co_3O_4$ and 0.1585 g. of CoO (corresponding to the hypothetical composition $Pd_{1.9}Co_{1.9}O_4$) is placed in a silica tube, which is evacuated, sealed and heated as described in Example 1. X-ray diffraction analysis of the crystalline product obtained indicates that the product is hexagonal palladium cobalt oxide with a trace of $Co_3O_4$.

EXAMPLE 3

A mixture of 0.2246 g. of $PdCl_2$ and 0.1898 g. of CoO (corresponding to the theoretical composition $PdCoO_2$) is heated overnight at 700° C. in a sealed, evacuated silica tube as described in Example 1. After the reaction is completed, the tube is cooled, opened, and the crystalline reaction product is leached with water to remove $CoCl_2$. The resulting product is found by X-ray diffraction to consist primarily of hexagonal $PdCoO_2$, but contains traces of $Co_3O_4$ and Pd. A least-squares refinement of X-ray data obtained using a Guinier X-ray camera gives hexagonal cell parameters $a_0 = 2.830 \pm 0.002$ A. and $c_0 = 17.739 \pm 0.002$ A. for the $PdCoO_2$ phase obtained in this example.

EXAMPLE 4

(A) The conditions of Example 3 are repeated except that an excess of $PdCl_2$ is used. This excess is calculated by assuming that the reagent palladium chloride is the dihydrate, $PdCl_2 \cdot 2H_2O$. The product of this reaction, after washing to remove $CoCl_2$ and excess $PdCl_2$, is found by X-ray diffraction to consist only of the desired $PdCoO_2$ phase. This product is found to be metallic with a room-temperature resistivity perpendicular to the c-axis of $4 \times 10^{-6}$ ohm-cm.

(B) The reaction described in Example 4A is repeated to provide a sample of product for elemental analyses. The crude reaction product is first washed in hot 1:1 47% hydrobromic acid:water to remove $CoCl_2$ and excess $PdCl_2$, and then in hot aqua regia to remove any trace of metallic palladium. After leaching, the product is washed in water and in acetone, and air-dried.

*Analysis.*—Calcd. for $PdCoO_2$: Pd, 53.99%; Co, 29.82%. Found: Pd, 53.16%; Co, 30.94%.

The "found" percentages of metal ions correspond to the composition $Pd_{1.003}Co_{1.057}O_2$.

EXAMPLE 5

A mixture of 0.1064 g. of Pd, 0.1773 g. of $PdCl_2$, and 0.2408 g. of $Co_3O_4$ is heated overnight at 750° C. in a sealed, evacuated, silica tube. After reaction is completed, the tube is cooled, opened, and the crystalline product is leached with water to remove $CoCl_2$. The resulting product is found by X-ray diffraction to consist primarily of hexagonal $PdCoO_2$, but contains a small amount of unreacted $Co_3O_4$.

EXAMPLE 6

A mixture of 0.1064 g. of Pd, 0.1473 g. of $PdCl_2$, and 0.4917 g. of $LaCoO_3$ is heated overnight at 750° C. in a sealed, evacuated, silica tube. After reaction is completed, the tube is cooled, opened, and the product is washed in water. The resulting product is found by X-ray diffraction to consist of hexagonal $PdCoO_2$ contaminated with LaOCl.

The procedure of this example is not limited to use of $LaCoO_3$. Thus the La (III) ion may be replaced with Y (III) or a trivalent lanthanide metal ion of atomic number 58–71, inclusive. Similarly, ternary oxides of chromium (III) or rhodium (III) and the aforementioned lanthanum, trivalent yttrium or lanthanide metals react with Pd and $PdCl_2$ to produce, respectively, $PdCrO_2$ and $PdRhO_2$.

EXAMPLE 7

$PdCrO_2$ is prepared by reacting a mixture of 0.3192 g. Pd, 0.5319 g. of $PdCl_2$, and 0.5456 g. of $LiCrO_2$ overnight at 800° C. in a sealed, evacuated, silica tube. After leaching in water to remove LiCl, the greyish-black powder is rinsed with acetone, separated by decantation and air-dried. X-ray diffraction analysis of the product indicates that it consists of a single phase that is isomorphous with $PdCoO_2$. X-ray data obtained using a Guinier-de Wolf X-ray camera is successfully indexed on the basis of the assumed structure and a least-squares refinement of the data gives hexagonal cell edges $a_0=2.9230\pm0.0003$ A. and $c_0=18.087\pm0.002$ A.

EXAMPLE 8

The conditions of Example 7 are repeated except that reaction is carried out at 775° C. The product of this example is also a powder and is found to be a single-phase of $PdCrO_2$ by X-ray diffraction analysis. The electrical resistivity of this sample is measured using a two-probe method on the powder compacted at 36 tons per square inch and is found to decrease with decreasing temperature in a manner typical of metal-like conductors. The measured values of resistivity were about $1.5\times10^{-2}$ ohm-cm. at 298° K. and about $1.0\times10^{-2}$ ohm-cm. at 90° K. In view of possible errors inherent in two-probe measurements and in measurements obtained on powder compacts, the cited values must be regarded only as upper limits of the intrinsic resistivity of $PdCrO_2$ at these temperatures.

EXAMPLE 9

$PdRhO_2$ is prepared by reaction of a mixture of 0.2128 g. of Pd, 0.3546 g. of $PdCl_2$, and 0.5674 g. of $LiRhO_2$ overnight at 800° C. The product of this reaction is leached in water to remove LiCl, rinsed with acetone, separated by decantation, and air-dried. An X-ray diffraction pattern of the powder indicates that $PdRhO_2$ is isomorphous with $PdCoO_2$ and $PdCrO_2$. This result is confirmed by successful indexing of data obtained with a Guinier-de Wolf X-ray camera on the basis of the assumed structure. A least squares refinement of the data gives hexagonal cell edges $a_0=3.02085\pm0.00014$ A. and $$c_0=18.083\pm0.001 \text{ A.}$$

EXAMPLE 10

The quaternary oxide $PdCr_{0.5}Rh_{0.5}O_2$ is prepared by reaction of a mixture of 0.1064 g. of Pd, 0.1773 g. of $PdCl_2$, 0.0909 g. of $LiCrO_2$, and 0.1419 g. of $LiRhO_2$ for a period of about 16 hours at 775° C. The product of this reaction is leached in water to remove LiCl, rinsed with acetone, separated by decantation, and air-dried. An X-ray diffraction pattern of the powder is found to be typical of those for the $CuFeO_2$-like structure of $PdCoO_2$, $PdCrO_2$ and $PdRhO_2$. The positions of the diffraction lines are intermediate between those expected for $PdCrO_2$ and for $PdRhO_2$, thus evidencing the formation of the intermediate composition containing both Cr and Rh.

EXAMPLE 11

A sample consisting of 0.931 g. of PdO and 0.569 g. of CoO is thoroughly mixed by hand grinding with an agate mortar and pestle. The resulting mixture is placed in a platinum tube which is then sealed at the top by fusion. The tube and its contents are heated for 12 hours at 800° C. with an externally applied pressure of 3 kb. in a conventional pressure vessel capable of withstanding high temperatures and pressures. After rapid cooling, the product is removed, ground to a fine powder, and subjected to analysis by X-ray diffraction. The resulting diffraction pattern is typical of that expected for a single-phase sample of hexagonal $PdCoO_2$.

The palladium-containing oxides of this invention are useful as components in ceramic electrical resistor compositions. These compositions are especially suitable for applying to, and firing on, ceramic dielectric materials to produce electrical resistors. Such resistor compositions can be prepared by mixing the finely divided ternary oxide with finely divided vitreous enamel or glass frit. Proportions of oxide to glass frit ranging from 3:1 to 1:1 give good results. The mixture of ternary oxide and glass frit may, if desired, be mixed with a liquid or paste vehicle, e.g., water, alcohols, esters, liquid resins, and the like, with or without thickeners to provide compositions having a consistency suitable for the particular method to be used in applying the composition to the ceramic dielectric. The finished resistor can be prepared by applying the composition to the ceramic dielectric material by conventional means, e.g., by spraying, stencilling, screen printing, dipping or brushing. The ceramic dielectric base material can be composed of any ceramic material that can withstand firing temperature of the oxide-vitreous enamel composition, e.g., glass, porcelain, barium titanate, aluminum oxide, and the like. After the composition is applied in a uniform thickness, e.g., of the order of 15 to 25 microns, the composition is dried, if necessary, to remove solvent from the vehicle and then fired in a conventional lehr or furnace at a temperature at which the enamel frit is molten whereby the conductive material is bonded to the ceramic dielectric.

The use of the palladium-containing oxides of this invention in specific electrical resistor compositions and the application of such compositions to a ceramic dielectric base are illustrated in detail below for the case of $PdCoO_2$:

EXAMPLE A

A sample of palladium cobalt oxide (10 g.) prepared by the procedure described in Example 4 is ground in 5 ml. of water in a 1-quart ball-mill with 1 lb. of alumina balls until it passes 100% through a 325-mesh screen. The slurry is removed from the ball-mill and dried. The resulting palladium cobalt oxide is used to prepare the compositions listed in Table I. In these compositions, the proportions of ingredients are expressed in parts by weight and the glass used is a powdered (ball-milled) glass composed of: ZnO, 27.7%; $SiO_2$, 21.7%; $B_2O_3$, 26.7%; $Al_2O_3$, 5.8%; $Na_2O$, 8.7%; CaO, 3.9%; BaO, 0.8%; PbO, 0.7%; $ZrO_2$, 4.0%.

TABLE II.—RESISTOR COMPOSITIONS

| Composition No. | 1 | 2 | 3 |
|---|---|---|---|
| PdCoO₂ | 70 | 50 | 20 |
| Glass | 30 | 50 | 80 |
| Butyl carbitol acetate | 150 | 150 | 150 |
| Ethyl cellulose (low viscosity) | 1 | 1 | 1 |

Three steatite (of the type known commercially as "Alsimag" 196) rods ⅛″ in diameter and ¾″ long are coated with composition No. 1 by dipping and then dried. The coated rods are fired at 800° C. for 15 minutes. Bands of commercial silver paste ⅛″ wide are applied to each end of the rods and the rods are then fired at 540° C. for 10 minutes. Wires are attached to the silvered ends by means of tin-lead (63–37) solder. One of the composite resistors is shown in FIG. 1 wherein 10 represents the coated and conductive surface of the resistor, 11 and 12 the silver end bands, and 13 and 14 the conductive leads. This composition has a 4000 ohm/square sheet resistivity. The conductive paths of the coated rods are lengthened by cutting spiral grooves around the rods by means of a diamond tool in a lathe as shown in FIG. 2, where 15 represents a nonconductive groove cut in the conductive surface, the other numerals being as in FIG. 1. The resistance of the rod is raised about a factor of 10 by this process. Different path lengths are formed on each of the three rods by varying the number of spirals.

The rods are then subjected to the "forming gas" test which consists of measuring the resistance of the rods before and after exposing them to forming gas (85% nitrogen and 15% hydrogen) at 100° C. for 3 hours. The resistance is measured by a commercial impedance bridge (General Radio, Type 1608 A). A palladium-silver fixed resistor is used as a control. Results of tests on the above resistors are given in the following Table II.

TABLE II.—ELECTRICAL RESISTORS

| Resistor | Resistance, ohms | | Loss in resistance, percent |
|---|---|---|---|
| | Before exposing to forming gas | After exposing to forming gas | |
| A | 81,200 | 79,040 | 2.7 |
| B | 74,680 | 72,800 | 2.5 |
| C | 108,050 | 107,610 | 0.4 |
| Control | 7,330 | 940 | 87.2 |

These tests show that the palladium cobalt oxide of this invention is capable of producing resistors that are much more stable in a reducing atmosphere than a commercial palladium-silver glaze resistor.

Since obvious modifications and equivalents in the invention will be evident to those skilled in the chemical arts, we propose to be bound solely by the appended claims.

The embodiments of the invention in which an exclusive property or privilege is claimed are defined as follows:

1. An electrically conductive oxide of palladium and at least one of Co, Cr, Rh and Cr/Rh having a crystal structure base on the rhombohedral space group R$\bar{3}$m and one of the formula PdCoO₂ and PdCr$_x$Rh$_{1-x}$O₂, wherein $x$ is in the range 0–1.

2. The electrically conductive oxide of claim 1 having the formula PdCoO₂ and a crystal structure based on the rhombohedral space group R$\bar{3}$m with cell edge $a=6.13\pm0.05$ A. and the rhombohedral angle $\alpha=26°\,40'\pm5'$.

3. An electrically conductive oxide of claim 1 having the formula PdCr$_x$Rh$_{1-x}$O₂, wherein $x$ is in the range 0–1, and a crystal structure based on the rhombohedral space group R$\bar{3}$m with cell edge $a=6.265\pm0.055$ A. and the rhombohedral angle $\alpha=27°\,26'\pm31'$.

4. The electrically conductive oxide of claim 3 having the formula PdCrO₂.

5. The electrically conductive oxide of claim 3 having the formula PdRhO₂.

6. The electrically conductive oxide of claim 3 having the formula PdCr$_{0.5}$Rh$_{0.5}$O₂.

References Cited

UNITED STATES PATENTS 3,414,371   12/1968   Rogers _____ 23—50

OTHER REFERENCES

Haslop et al., "Inorganic Chemistry," Elsevier Publishing Co., New York, 1963, pp. 501–508.

HERBERT T. CARTER, Primary Examiner

U.S. Cl. X.R.

23—50, 139, 203, 315; 117—201; 252—519; 338—308